UNITED STATES PATENT OFFICE.

GUSTAV EDUARD FERDINAND GRÜNE, OF UNTERLÜSS, PRUSSIA, GERMANY.

PREPARING DYNAMITE.

SPECIFICATION forming part of Letters Patent No. 397,285, dated February 5, 1889.

Application filed December 12, 1887. Serial No. 257,695. (No specimens.) Patented in France February 1, 1887, No. 181,183; in Belgium June 9, 1887, No. 77,768, and in England June 23, 1887, No. 8,970.

*To all whom it may concern:*

Be it known that I, GUSTAV EDUARD FERDINAND GRÜNE, a subject of the King of Prussia, residing at Unterlüss, in the Kingdom of Prussia, Germany, have invented new and useful Improvements in the Manufacture of Dynamite Cartridges, (for which I have obtained Letters Patent in France, No. 181,183, dated February 1, 1887; Belgium, No. 77,768, dated June 9, 1887, and England, No. 8,970, dated June 23, 1887,) of which the following is a specification.

In the manufacture of dynamite cartridges with kieselguhr (infusorial earth) and glycerine, it is a well-known fact that the glycerine absorbed by the kieselguhr is very violently expelled again from the latter as soon as the mixture, or a cartridge made therefrom, comes into contact with the water. This behavior of the kieselguhr dynamite in the presence of water necessitates great precaution in storing it, and blasting or blowing up under water by means of kieselguhr dynamite and the ramming of a loaded blast-hole with water are consequently rendered very difficult. These objections are overcome by my improved method of manufacturing kieselguhr dynamite cartridges, as hereinafter described, without reducing the absorbing capacity of the kieselguhr, and without adding any substance which may diminish the explosive power of the nitro-glycerine. Kieselguhr dynamite has heretofore been made by mixing nitro-glycerine with the loose kieselguhr until saturated, this mixture being afterward molded by hand or by machinery into the form of plastic cartridges.

The main feature of my invention consists in the previous manufacture of consolidated or compressed cartridges of kieselguhr, which formed cartridges are carbonized and retain an absorbing capacity equal to that of the loose kieselguhr. These formed cartridges are simply immersed in nitro-glycerine until saturated, in order to convert them into dynamite, the advantage of this process being that it obviates all the dangers hitherto attending the manufacture of dynamite cartridges. These cartridges, after being converted into dynamite by the absorption of nitro-glycerine, are enveloped in a water-proof covering, so that the danger of exudation of the nitro-glycerine, inevitable with the kieselguhr cartridges as hitherto made, is avoided, and the liability of the nitro-glycerine to freeze in the cartridges is greatly reduced.

In order to manufacture the cartridges, the kieselguhr is subjected to such pressure as is requisite to bring it to the required shape, and it is heated to redness, so as to carbonize it. In making these cartridges of kieselguhr they may be provided with a protective covering, even during carbonization, by the addition of a suitable flux. The power of water to expel the nitro-glycerine from the kieselguhr cartridges is greatly reduced by using kieselguhr with which has been combined carbon in one form or another. The combination may be formed by adding to the kieselguhr corresponding quantities of vegetable or animal carbon—such as soot, wood, charcoal, animal charcoal, blood, coal, and the like—or by employing vegetable or animal substances—such as starch, sugar, cellulose, and the like, blood, glue, caseine, and the like— carbonized in kieselguhr which has been combined with said substances prior to the carbonization of the latter. The power of water to expel the nitro-glycerine from the kieselguhr may be entirely and completely prevented by using what is termed "kieselguhr carbon," which is obtained by heating to redness, without access of air, kieselguhr in a washed or unwashed state, and mixing with it a large quantity of organic substances. The carbon surrounds and penetrates completely each single particle of the kieselguhr, and gives so intimate a mixture of kieselguhr and the carbon as cannot be obtained by mechanical means. The absorbent capacity of kieselguhr carbon is greatly superior to that of most kinds of kieselguhr.

Kieselguhr dynamite made by my invention may be kept and transported under water without diminishing its explosive power. The congealing of the nitro-glycerine is impossible when the cartridges are transported and kept in water having a temperature of from 30° to 60°. Frozen cartridges may easily be thawed out in warm water without any danger.

Blasting under water without surrounding the cartridges with any case and the ramming of the loaded blast-holes with water, even if they should stand for several days, are by this invention rendered possible.

I claim as my invention—

The herein-described method of manufacturing cartridges, consisting in pressing kieselguhr into the form of cartridges, then carbonizing them, and finally saturating them with nitro-glycerine, substantially as set forth.

In testimony whereof I have signed my name to this specification in the presence of two subscribing witnesses.

GUSTAV EDUARD FERDINAND GRÜNE.

Witnesses:
GUSTAV HÜLSMANN,
B. ROI.